(12) United States Patent
Ananda kumar et al.

(10) Patent No.: US 9,773,237 B2
(45) Date of Patent: Sep. 26, 2017

(54) SYNCHRONOUS SPLIT PAYMENT TRANSACTION MANAGEMENT

(71) Applicant: GLOBALFOUNDRIES INC., Grand Cayman (KY)

(72) Inventors: Srihari N. Ananda kumar, Mysore (IN); Lohith Ravi, Bangalore (IN); Rajath Ramesh, Mysore (IN)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/310,470

(22) Filed: Jun. 20, 2014

(65) Prior Publication Data

US 2015/0149350 A1    May 28, 2015

Related U.S. Application Data

(63) Continuation of application No. 14/089,873, filed on Nov. 26, 2013, now abandoned.

(51) Int. Cl.
| | | |
|---|---|---|
| G06Q 40/00 | (2012.01) | |
| G06Q 20/22 | (2012.01) | |
| G06Q 20/14 | (2012.01) | |
| G06Q 20/10 | (2012.01) | |
| G06Q 20/40 | (2012.01) | |

(52) U.S. Cl.
CPC .............. *G06Q 20/29* (2013.01); *G06Q 20/10* (2013.01); *G06Q 20/14* (2013.01); *G06Q 20/407* (2013.01)

(58) Field of Classification Search
CPC ........ G06Q 10/00; G06Q 20/00; G06Q 30/00; G06Q 40/00
USPC ....................................................... 705/3–44
See application file for complete search history.

(56) References Cited

U.S. PATENT DOCUMENTS

| | | | | |
|---|---|---|---|---|
| 7,177,836 B1 * | 2/2007 | German et al. | ................. | 705/40 |
| 7,725,325 B2 * | 5/2010 | Dawson | ............. | G06Q 10/0635 |
| | | | | 705/7.28 |
| 7,742,989 B2 * | 6/2010 | Schultz | .......................... | 705/40 |
| 7,949,580 B1 * | 5/2011 | Boyer | .................... | G06Q 20/02 |
| | | | | 705/35 |
| 7,958,052 B2 * | 6/2011 | Powell | .................... | G06Q 20/32 |
| | | | | 705/44 |

(Continued)

FOREIGN PATENT DOCUMENTS

WO    2012099353 A2    7/2012

OTHER PUBLICATIONS

IBM, "A method for implementing "Split bill" e-paymant", An IP.com Prior Art Database Technical Disclosure, May 30, 2006, IPCOMM000136722D, pp. 1-2.

(Continued)

*Primary Examiner* — Frantzy Poinvil
(74) *Attorney, Agent, or Firm* — Scully, Scott, Murphy & Presser, P.C.; Eunhee Park

(57) ABSTRACT

A software- and/or hardware-based transaction manager that reflects the application program interface(s) and/or system(s) for establishing sessions used to commit to, rollback and/or execute multiple payments made pursuant to a single financial transaction. This is accomplished by sharing sessions through co-browsing, or by continuous event logging and maintaining synchronous payments across a group of users in order to support the lifecycle of each individual payment and session along with completion responsibility of the overall transaction.

19 Claims, 8 Drawing Sheets

500a

Alice : Logged in.
Alice : Payment locked $600.
Bob : Logged in.
Charlie : Logged in.
Bob : Payment locked $600.
Charlie : Payment locked $600.
Transaction manager : Payment reached total. Press <Enter> to complete the transaction.
Alice : Accepted the transaction.
Transaction manager : Alice, Bob, and Charlie completed the transaction with $1800.

00:25:00
Session Timeout

(56) References Cited

U.S. PATENT DOCUMENTS

| | | |
|---|---|---|
| 8,255,303 B2 * | 8/2012 | Scipioni .......................... 705/35 |
| 8,280,788 B2 | 10/2012 | Perlman |
| 8,396,808 B2 * | 3/2013 | Greenspan ...................... 705/64 |
| 8,606,598 B2 * | 12/2013 | Chishti et al. ..................... 705/2 |
| 2007/0143209 A1 * | 6/2007 | German et al. ................. 705/44 |
| 2009/0144170 A1 * | 6/2009 | Dickelman ..................... 705/26 |
| 2009/0327129 A1 | 12/2009 | Collas et al. |
| 2010/0121745 A1 | 5/2010 | Teckchandani et al. |
| 2012/0143753 A1 | 6/2012 | Gonzalez et al. |
| 2012/0143761 A1 | 6/2012 | Doran et al. |
| 2012/0150728 A1 | 6/2012 | Isaacson et al. |
| 2012/0215660 A1 | 8/2012 | Cavagnaro |
| 2012/0226614 A1 | 9/2012 | Gura et al. |
| 2013/0041824 A1 * | 2/2013 | Gupta .................... G06Q 40/00 705/44 |
| 2013/0046679 A1 | 2/2013 | Davoust |
| 2013/0054330 A1 | 2/2013 | O'Donnell et al. |
| 2015/0100482 A1 | 4/2015 | Zamer et al. |

OTHER PUBLICATIONS

Disclosed Anonymously, "Method and System for Providing Contribution for a Purchase over a Social Network", An IP.com Prior Art Database Technical Disclosure, IPCOM000202110D, Dec. 3, 2010, pp. 1-2.

* cited by examiner

SYNCHRONOUS SPLIT PAYMENT TRANSACTION MANAGEMENT

CROSS-REFERENCE TO RELATED APPLICATIONS

The present application is a continuation application of U.S. patent application Ser. No. 14/089,873 filed Nov. 26, 2013, now abandoned.

FIELD OF THE INVENTION

The present disclosure relates generally to the field of payment processing, and more particularly to the technical architecture and participation process associated with group payments.

BACKGROUND OF THE INVENTION

Computer network communication "sessions" between two, or more, separate endpoints, respectively identified by network addresses, are known. A "session," as that term is used herein, defines at least some of the resource(s) associated with a particular user. Sharing the resources of one user to another user is conventionally accomplished by co-browsing or by other ways of continuous synching (for example, repetitive logging of events). One popular example of a communication session is a TCP/IP (transmission control protocol/internet protocol) session. In a TCP/IP session, a session provides reliable, ordered, error-checked delivery of a stream of octets between network-connected endpoints. As a further example, some communication sessions between endpoints instead use the connectionless User Datagram Protocol (UDP), which emphasizes low-overhead operation and reduced latency rather than error checking and delivery validation. There are still other existing protocols for creating a session, and it is quite possible that still more protocols will be developed in the future. Despite the differences among various types of sessions, in a computer network communication system, once the session is established and active, each endpoint that receives a communication (such as a set of data packets) will "know" which endpoint sent the communication. For example, if only a first endpoint and second endpoint mutually establish a communication session between them, then, so long as the session remains active, the first endpoint will know that communications received through the session are from the second endpoint, and the identity of the second endpoint does not need to be re-determined (for example, re-authenticated) for every communication received in the context of the active and on-going session.

A financial transaction is an exchange of money or some other financial asset for something else of value, such as information, goods, services, or money. A financial transaction involves at least two parties: a payer, who gives up the financial asset, and a payee, who receives it. The parts of a financial transaction need not occur simultaneously. For example, money could be given at one time, and the goods given in return at another. A financial transaction could also include the giving of a gift, where the thing of value received in exchange for the financial asset given is the intangible benefit to the payer of the act itself or the results it does or is expected to produce.

A payer in a financial transaction may also be a payee in the same transaction. This is the case, for instance, when an individual moves money from one bank account to another. A payer or payee may be a natural person or any other legal entity.

In the context of a payment transaction, "commitment" is when a payer party has been effectively informed that she is legally bound to make a payment (regardless of whether the party is bound, in fact and law, under the contract law of her jurisdiction(s)). This occurs when handing cash to a cashier, signing a credit card payment receipt, or when clicking a button to confirm a purchase placed on an e-commerce website.

As used herein, the relatively broad concept of "consummation" of a payment transaction includes the following types: (i) legally binding consummation (or, "being legally bound"), which status begins at the point(s) in time at which the payer(s) are legally bound to pay (whether they realize it or not); (ii) commitment consummation, which status begins at the point(s) in time at which the payer(s) are sufficiently notified that they are bound to pay such that a reasonable person in the payer's circumstances would consider herself bound to pay; (iii) execution type consummation, which status begins at the point(s) in time at which money, or other consideration, is actually transferred from effective possession of the payer(s) to effective possession of the payee(s); and (iv) completed-transaction-notification type consummation, which status begins at the point(s) in time at which the payer(s) are reasonably considered to have been notified that their money, or other consideration, has been transferred out of their effective possession. These types of consummation may, or may not, occur within seconds of each other (for example, substantially at the same time), and these types of consummation may overlap—they are not mutually exclusive ways of describing consummation status in a given payment transaction.

Execution, for its part, can be broken down into various sub-types including: (i) pending execution, which refers to status after execution has been requested of the parties who are actually effecting the transfer of money, but before execution is resolved; and (ii) resolved execution, which refers to the status after the point(s) in time at which the funds are transferred (or transfer is denied, for example, for insufficient credit in a credit card account). In many cases, pending execution will last a very, very short time because systems (for example, electronic payment systems) take a very short time to respond to a request that funds be transferred from a payer to a payee.

SUMMARY

According to one aspect of the present disclosure, there is a computer program product, system and/or method which performs the following actions (not necessarily in the following order and not necessarily in serial sequence): (i) establishing a set of communication session(s), over a communication network, between a plurality of payers and a transaction management computer; and (ii) receiving from each payer of the plurality of payers, through the communication session(s), a commitment to enter into a first financial transaction. Each payer of the plurality of payers is connected, by the set of communication session(s), to the transaction management computer at a time of receipt of a latest in time commitment.

DETAILED DESCRIPTION

Figure 1:
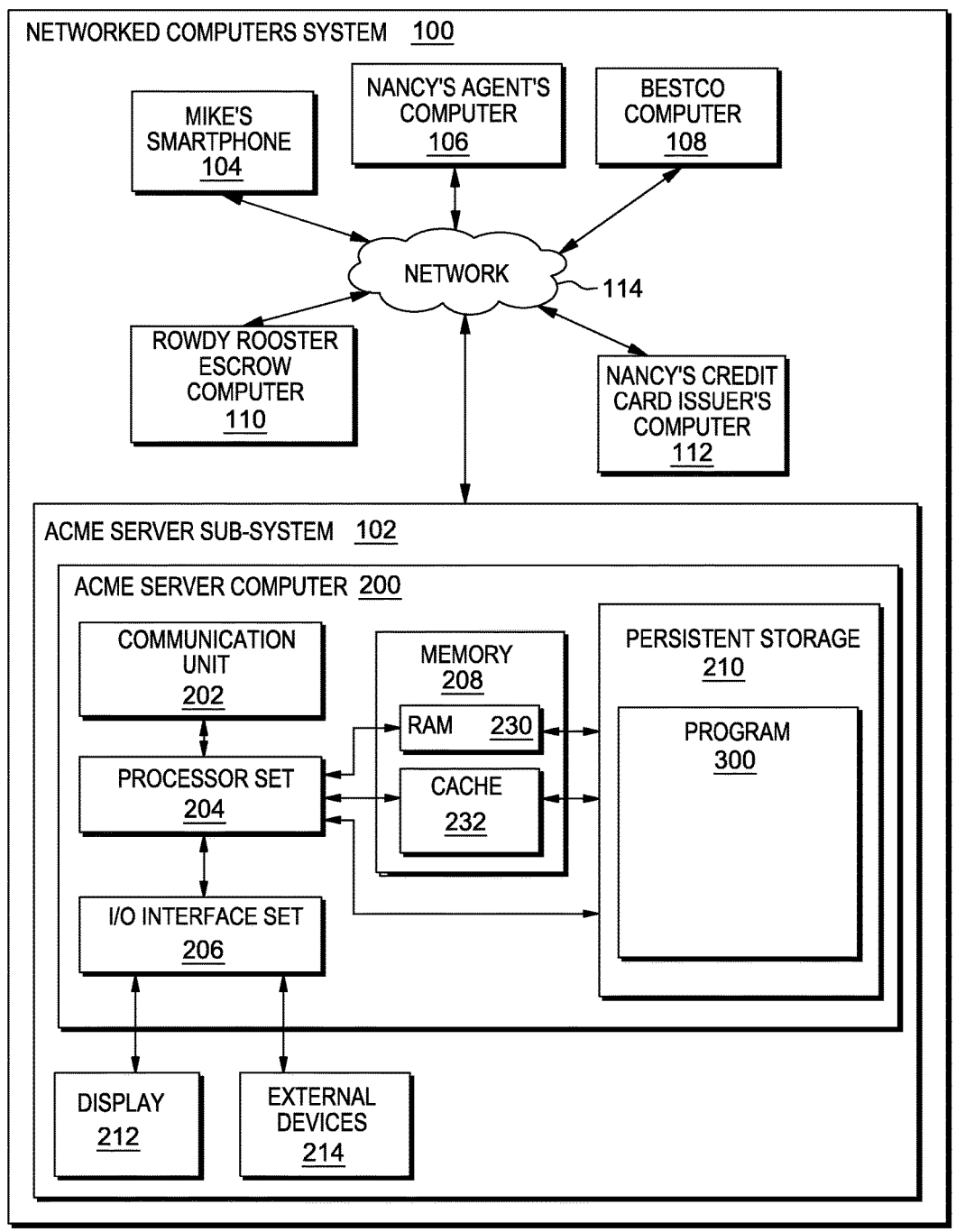
FIG. 1 is a schematic view of a first embodiment of a networked computers system (including one or more processing devices) according to the present invention.

This Detailed Description section is divided into the following sub-sections: (i) The Hardware and Software Environment; (ii) First Embodiment; (iii) Further Comments and/or Embodiments; and (iv) Definitions.

I. The Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) "Java" may be subject to trademark rights in various jurisdictions throughout the world and are used here only in reference to the products or services properly denominated by the marks to the extent that such trademark rights may exist), Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

An embodiment of a possible hardware and software environment for software and/or methods according to the present invention will now be described in detail with reference to the Figures. FIG. 1 is a functional block diagram illustrating various portions of networked computers system 100, including: Acme server computer sub-system (that is, a portion of the larger computer system that itself includes a computer) 102; Mike's smartphone (client sub-system) 104; Nancy's agent's computer (client sub-system) 106; BestCo computer (client sub-system) 108; Rowdy Rooster Escrow computer (client sub-system) 110; Nancy's credit card issuer's computer (client sub-system) 112; communication network 114; Acme server computer 200; communication unit 202; processor set 204; input/output (i/o) interface set 206; memory device 208; persistent storage device 210; display device 212; external device set 214; random access memory (RAM) devices 230; cache memory device 232; and program 300.

As shown in FIG. 1, Acme server computer sub-system 102 is, in many respects, representative of the various computer sub-system(s) in the present invention. Accordingly, several portions of computer sub-system 102 will now be discussed in the following paragraphs.

Server computer sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the First Embodiment sub-section of this Detailed Description section.

Server computer sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

It should be appreciated that FIG. 1 provides only an illustration of one implementation (that is, system 100) and does not imply any limitations with regard to the environments in which different embodiments may be implemented. Many modifications to the depicted environment may be made, especially with respect to current and anticipated future advances in cloud computing, distributed computing, smaller computing devices, network communications and the like Likewise, the terms "client" and "server" are not to be taken as limiting the functionality of any particular device referred to herein by these terms, as some or all of the various computers in system 100 could function as a client, as a server, as both, or as neither, depending upon the specific implementation and context in which a given device is operating.

As shown in FIG. 1, server computer sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102, such as client sub-systems 104, 106, 108, 110, and 112. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

II. First Embodiment

Preliminary note: The flowchart and block diagrams in the following Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
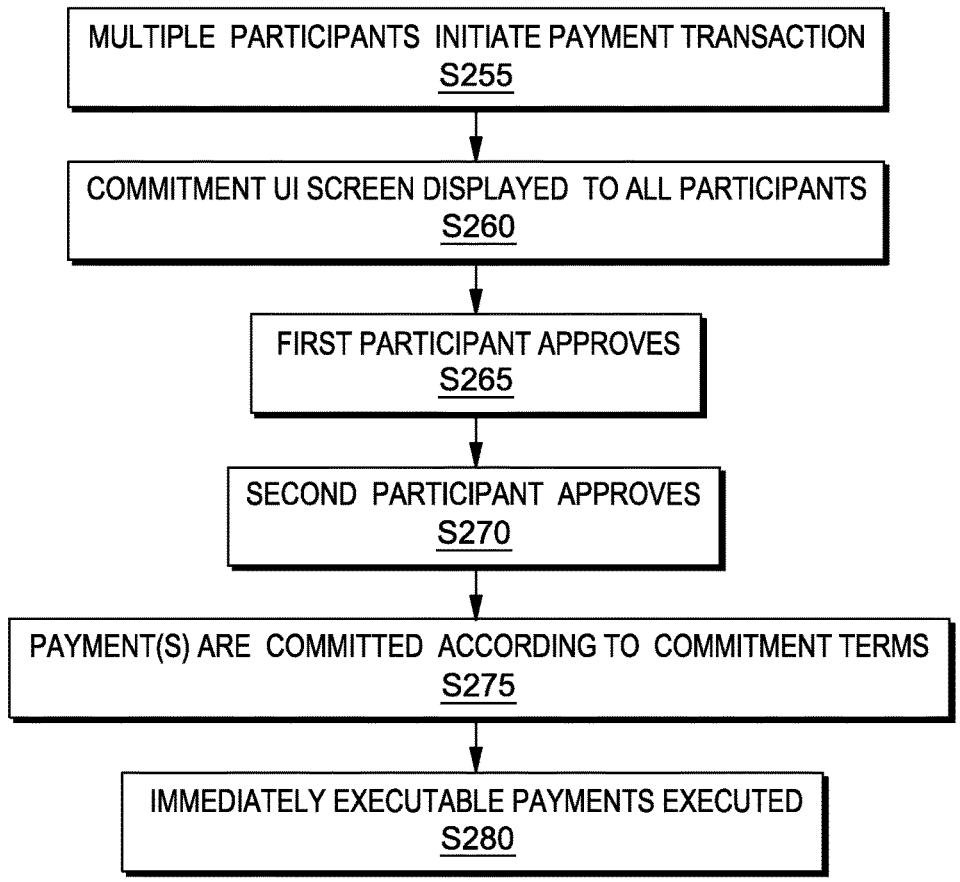
FIG. 2 is a flowchart showing a process performed, at least in part, by the first embodiment computer system.
Figure 3:
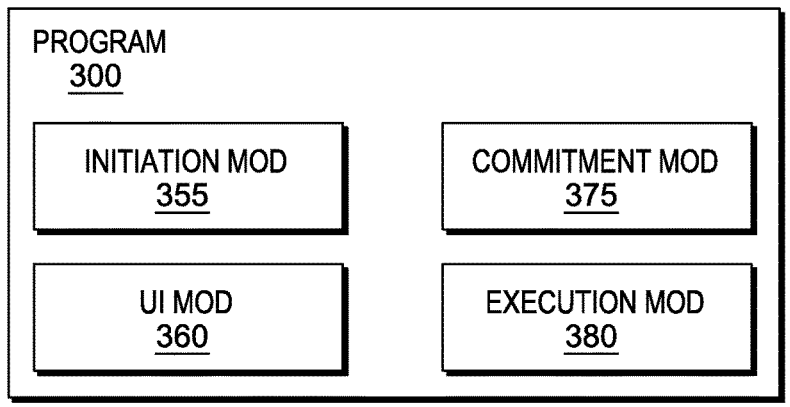
FIG. 3 is a schematic view of a portion of the first embodiment computer system.

FIG. 2 shows flow chart 250 depicting a method according to the present invention. FIG. 3 shows program 300 for performing at least some of the method steps of flow chart 250. This method and associated software will now be discussed, over the course of the following paragraphs, with extensive reference to FIG. 2 (for the method step blocks) and FIG. 3 (for the software blocks).

Processing begins at step S255, where initiation mod 355 initiates a payment transaction involving one or more parties and a financial institution (see definition of "financial institutions," below, in the Definitions sub-section of this Detailed Description). In this embodiment, the payers are named Mike and Nancy, and the payees are Acme Widget Company, Bestco and Rowdy Rooster Escrow Company. In this example, none of the payees are a financial institution. Alternatively, the payee could be a financial institution. The payment was initiated co-operatively by Mike (working on smartphone 104, see FIG. 1), Nancy's agent (working on computer 106 with a virtual private network (VPN) connection, see FIG. 1) and the Acme Widget company server computer sub-system 102 (see FIG. 1).

In this example, mod 355 sets up three (3) communication sessions which will all substantially overlap in time as the parties commit to and execute at least some of their various split payments. More specifically, mod 355 sets up the following sessions (also called a three-way split session): (i) first session between Mike's smartphone 104 and Acme server sub-system 102; (ii) second session between Nancy's agent's computer 106 and Acme server sub-system 102; (iii) a third session between Nancy's credit card issuer's computer 112 (including any intermediate gateway computers (not separately shown in FIG. 1)) and Acme server sub-system 102. In this example, mod 355 acts as the transaction manager for the three concurrent sessions. Alternatively, there could be a single session to which Acme's sub-system, Mike, Nancy's agent, and Nancy's credit card issuer's computer are all parties.

Figure 4:
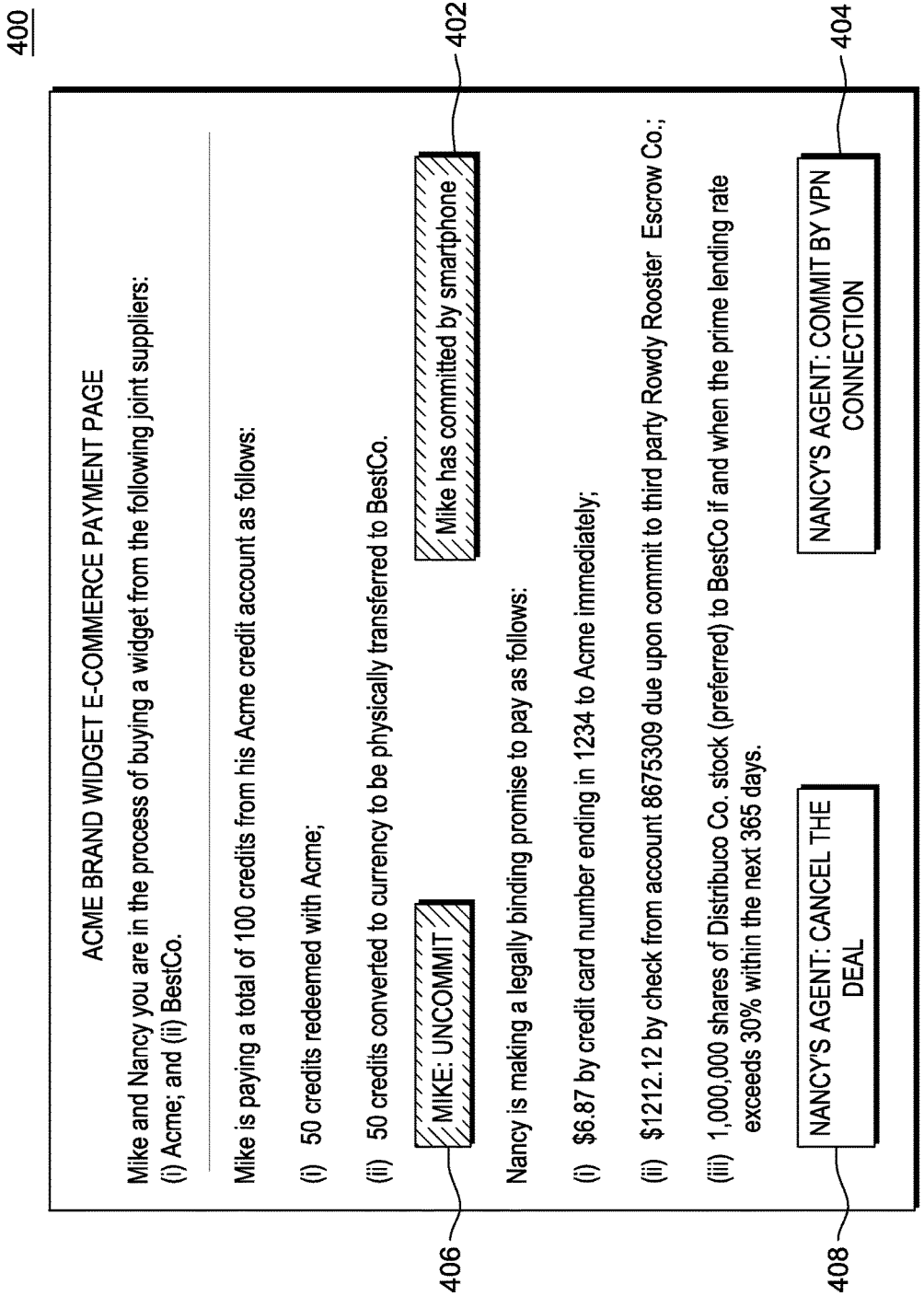
FIG. 4 is a screenshot generated by the first embodiment computer system.

Processing proceeds to step S260, where user interface mod 360 displays a commitment screen to Mike (on his device 104) and Nancy's agent (on her device 106). This commitment screen display is shown by screenshot 400 of FIG. 4. It is substantially the same display for both Mike and Nancy's agent, except that: (i) Mike's display will never show buttons 404 and 408 as clickable buttons; and (ii) Nancy's agent's display will never show buttons 406 and 402 as clickable buttons.

During step S260, mod 355 maintains the three-way split session involving Mike, Nancy's agent, Nancy's credit card issuer's computer, and Acme's subsystem. This three-way split session allows mod 360 to easily and reliably send the commitment screen information to Mike and Nancy's agent and keep all participating parties in sync.

Processing proceeds to step S265, where user interface mod 360 of server sub-system 102 (see FIG. 1) receives approval information, indicating Mike's approval. More specifically, Mike clicks button 402 (see FIG. 4) on his smartphone 104 (see FIG. 1). In this example, this approval can be revoked by Mike, by hitting button 406 (see FIG. 4), so long as he acts before all of the other payers (in this case, Nancy acting through her agent) also approve. Alternatively, in some embodiments approval may not be revocable at all. Alternatively, Mike and Nancy may be given a short period to revoke (for example, five minutes) even after both of them have indicated their approval. Even if such a short revocation window is provided, the payment should still be considered as being executed "substantially simultaneously" to the last necessary approval.

During step S265, mod 355 maintains the three-way split session involving Mike, Nancy's agent, Nancy's credit card issuer's computer, and Acme's subsystem. This three-way split session allows mod 360 to easily and reliably receive approval information from Mike and keep all participating parties in sync.

Processing proceeds to step S270, where user interface mod 360 of server sub-system 102 (see FIG. 1) receives approval information, indicating Nancy's approval. More specifically, Nancy's agent clicks button 404 (see FIG. 4) on her computer 106 (see FIG. 1). In this example, the payment can be cancelled by Nancy's agent, by hitting button 408 (see FIG. 4), so long as she clicks button 408 prior to clicking button 404. In this example, Mike and Nancy's agent are acting in "real time," which means that Mike and Nancy's agent can see each other's actions quickly enough so that reasonable payers would consider that payment approvals and notification of payments are made at substantially the same time. For example, as a practical matter, if Mike has to wait an hour after Nancy's approval to be informed of the approval, then this would not be "in real time." On the other hand, if Mike has to wait ten seconds to be informed of Nancy's approval, then this latency is still consistent with "real time."

During step S270, mod 355 maintains the three-way split session involving Mike, Nancy's agent, Nancy's credit card issuer's computer, and Acme's subsystem. This three way split session allows mod 360 to easily and reliably receive approval from Nancy's agent and keep all participating parties in sync.

Processing proceeds to step S275, where commitment mod 375 "commits" (see definition in Background section, above) all payments by sending notification to both Mike and Nancy's agent that Mike and Nancy are committed to make the payments. Depending upon the applicable law of contracts, this may or may not be the same as the moment that Mike and Nancy become legally bound to make the payments. Also, depending upon the applicable law, and/or arrangements between the parties, Mike may or may not be responsible to make Nancy's payment, in case Nancy's payment fails, and vice versa. The notification reasonably should make Mike and Nancy's agent (and, constructively, Nancy) aware that they will have to make their payments and that there is no longer a chance to "back out of the deal." In some embodiments, step S275 may be omitted.

During step S275, mod 355 maintains the three-way split session involving Mike, Nancy's agent, Nancy's credit card issuer's computer, and Acme's subsystem. This three-way split session allows mod 375 to easily and reliably send the commitment screen information to Mike and Nancy's agent and keep all participating parties in sync.

Processing proceeds to step S280, where execution mod 380 conducts execution processing. More specifically, mod 380 performs the following sub-steps: (i) requests execution of payments that are immediately payable under the terms of the payment transaction and are also susceptible to being paid over a computer network; (ii) receives resolution of the execution requests it has made; and (iii) notifies Mike and Nancy's agent of how their immediately payable and immediately executable payment(s) have indeed been resolved (that is, paid, or refused). In some embodiments, sub-steps (i), (ii) and (iii) will take place "substantially instantaneously," meaning within a few seconds, or even a fraction of a second. After sub-step (i) is performed, execution of the payments-under-execution will be in pending status. After sub-step (ii), actual execution has taken place (for example, funds have been successfully transferred). Sub-step (iii) is post execution, and may be omitted due to prior notification at step S275. In this embodiment, sub-steps (i), (ii) and (iii) all take place among and between computers and through a communication network. In many embodiments, the executing parties will all be financial institutions.

At step S280, if an immediately payable and immediately executable payment is not successfully resolved, then this may impact other payments and/or the payment transaction as a whole. For example, if one immediately payable and immediately executable payment does not go through, then other immediately payable and immediately executable payments may be "rolled back."

Execution mod 380 performs, at a minimum, the initiation of execution of transaction components that can be automatically initiated. In some embodiments, execution mod 380 performs additional functions, such as placing reserve holds on credit card payment amounts or rolling back component transactions when for some reason the overall transaction cannot be completed. Also, as can be seen from FIG. 4, some required payments in the payment transaction may not be immediately payable (that is, due right away). Also, even payments due right away may not be executable over a communication network, such as payments which involve actual physical transfer of physical goods (see "currency" payment specified in screenshot 400 of FIG. 4).

During step S280, mod 355 maintains the three-way split session involving Mike, Nancy's agent, Nancy's credit card issuer's computer, and Acme's subsystem. This three-way split session allows mod 380 to easily and reliably: (i) effect execution with Nancy's credit card issuer's computer; (ii) notify Mike and/or Nancy's agent of any executed payment(s); and/or (iii) keep all participating parties in sync. In this example, the executed payments are: (i) the payment made by Nancy's credit card (see FIG. 4); and (ii) the payment in Acme credits made by Mike to Acme. Alternatively, Mike and Nancy's agent could have been dropped from the three-way split session either after Nancy's approval, or after notification of the parties of Nancy's approval, but prior to execution of Nancy's payment.

III. Further Comments and/or Embodiments

In some embodiments of the present invention, resources which are associated with various parties by the use of a session established under session protocol(s) are used to accomplish one, or more, of the following: (i) payment; (ii) maintaining the Commit; (iii) rollback; (iv) trust; and/or (v) such other major events in the payment. In some embodiments, time and frequency are associated with each session.

Some embodiments of the present disclosure seek to provide a technique for synchronously making a split payment. A split payment is one in which a single payment transaction is split between multiple distinct "payment vehicles" (for example, distinct credit and/or debit cards).

Some embodiments of the present disclosure may have one, or more, of the following features, characteristics and/or advantages: (i) provide a mechanism, system, and protocol to maintain the transaction life cycle for a split payment; (ii) address the problem of making multiple monetary payments in parallel during the life cycle of a single transaction; (iii) cover the parameters and trust co-efficiency factor involved in committing or rolling back payments during this life cycle (a trust co-efficiency factor pertains to questions such as: (a) whether the payment cards used are genuine, (b) whether the members involved in the transaction are genuine, and/or (c) whether there is a problem in the system, like one of the commits did not happen or there are discrepancies in the system or the payment gateway in associating the payments to one root radical transaction; if any problems are detected, the system can roll back the transaction); (iv) provide for situations where those involved in a split payment transaction are a set of anonymous untrusted participants, who use different payment vehicles across different communication networks, all managed within a single transaction life cycle and under a common paradigm for handling the transaction.

Some embodiments of the present disclosure recognize that the current trend toward group transactions, like group shopping and finding groups through social networking, has been moving forward with great zeal, but that while conducting transactions in any payee dashboard, the only option is for payment with just one single payment vehicle (for example, a single credit card). The mechanism presented in this disclosure solves this particular issue by presenting a solution where: (i) multiple users (see definition of "user," below, in the Definitions section of this Detailed Description section) can pay in parallel with different payment vehicles; and/or (ii) a single user can pay in parallel using multiple payment vehicles. For example, suppose a team of individuals wishes to book a flight. While booking online together, there could be a great offer presented based on the size of the group or the cost of the purchase, but some embodiments of the present invention recognize as a problem the fact that the e-commerce software supports only a single payment vehicle for making the payment for the multiple airline seats. Some embodiments of the present disclosure provide an option to make the payment in a distributed environment with: (i) multiple payers in the same transaction; and/or (ii) multiple payment vehicles for the same transaction.

Some embodiments of the present disclosure recognize that booking tickets for a large group using a single credit card or debit card can be potentially problematic for various reasons, including the following: (i) a low credit card/debit card limit (for example, eight people are booking flights and the cost per ticket is $1,000, but none of the eight people have a credit card with a limit greater than $5,000, which is less than the $8,000 needed to book all eight tickets); (ii) unavailability/synchronization problem (multiple independent transactions with different cards may result in a some people getting a ticket while others find that by the time they attempt to book, all seats are full); (iii) sharing problem (it can be a cumbersome and problematic process for the secondary payers in a group transaction to transfer their share of the overall cost to the primary payer). Some embodiments of the present disclosure provide a protocol to solve one, or more, of the foregoing problems.

In some embodiments of the present disclosure, a synchronous split payment is carried out by different people, with each person using: (i) her own mode of payment (mobile, Internet, telephone, or so forth); and/or (ii) her own payment vehicle. Some embodiments of the present invention can readily be used in real time to accommodate group transactions. An example of a payment method according to the present invention, from an end-user perspective, follows: (i) a primary user initiates a transaction and adds a set of payers; (ii) a co-browsing /co-editing session is opened that tracks the login status, payment status, and other state indicators of each of the users; (iii) each user specifies his or her contribution (or alternatively, the primary payer has already specified each person's contribution amount in step (i)); and (iv) once each user has locked in his or her contribution, a final commit is done, either automatically by one or more triggers or manually by one of the payers, thereby committing the main payment transaction and successfully completing the split payment. In this example method: (i) the co-browsing session has an expiry time which can optionally be extended; and (ii) if the session times out, by default the individual payment(s) made by each user will be rolled back.

Some embodiments of the present disclosure possess one or more of the following features: (i) parties to a transaction can add or vote out other parties; (ii) triggers can be set so that when the transaction amount is collectively reached by contributing parties, the main transaction is automatically committed; (iii) a long parent transaction is established that waits to commit or roll back individual payments of transaction participants; and (iv) setting of co-browsing sessions and handling of payments can be done by different modes.

To generalize the conditions that could be applied for a group payment, in some embodiments of the present disclosure, features such as the ability of a primary user to add other payers, the ability for parties in a transaction to vote out other parties, the ability to extend the main payment transaction session time, and so on can be configured policies that govern the group payment transaction. Whole governance is carried out by a policy engine which works closely with the system application. Furthermore, these policies can be enforced by a payee (fund-receiving party) or a payer (payment-making party).

For example, given a group payment made by Alice, Bob and Charlie for booking seats through an airline, the airline's policies could be configured thus: (i) do not allow extension of a session more that two times; (ii) each session extension is for 3 minutes and an additional charge of $10 (this could be even more granular); (iii) allow dynamic change of payment amount with payers' concordance; (iv) accept partial payment and allot seats to parties whose payments are done; and (v) commit payment only when the primary participant wants to do so. Numerous other alternatives are possible.

The primary participant (the payer who initiates the payment transaction) can also establish policies that will govern a transaction. For instance, the primary participant could establish the following set of policies: (i) other participants can demand change of payment mode; (ii) Participant A can ask Participant B to pay a certain amount (that is, dynamic changing of payment amount); (iii) allow other participants to add parties; and (iv) allow other participants to vote out parties. Numerous other alternatives are possible here as well.

Some embodiments of the present disclosure facilitate refunds by the vendor (that is, the payment recipient) in cases of incomplete transactions, such as where one of the co-payers failed to pay his or her portion of the transaction prior to session timeout, or where the transaction was withdrawn by one or more of the co-payers. In such cases, these embodiments auto-detect and refund the money of the payers who have already completed their portion of the failed transaction. Such a feature is helpful in situations where a user does not have an option to lock the transaction amount he or she is responsible for, but instead has only the option of submitting a payment or not.

Figure 5:
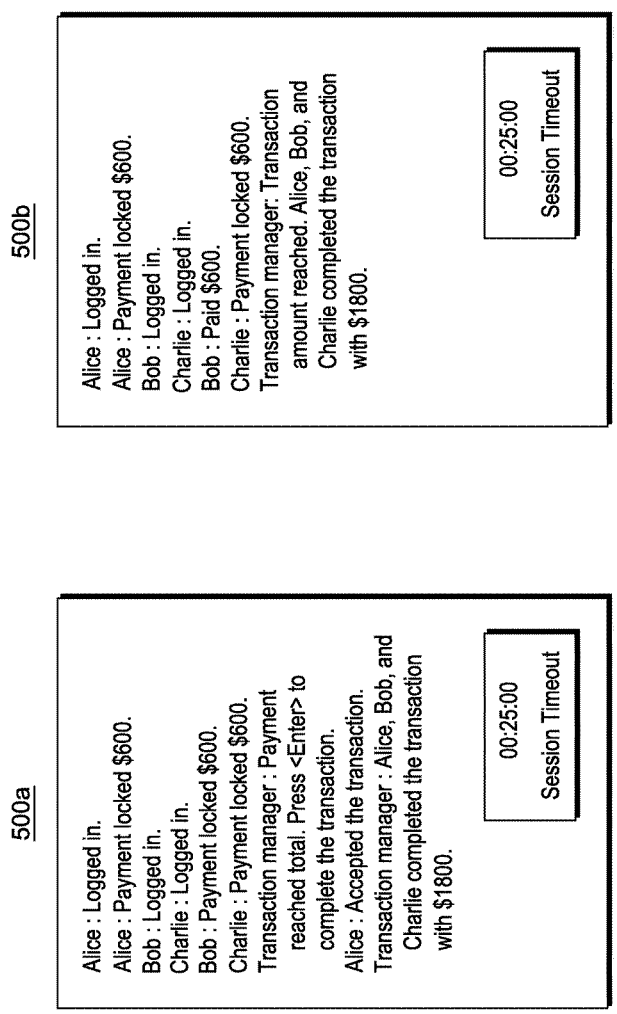
FIG. 5A is a screenshot generated by a second embodiment computer system.
FIG. 5B is a screenshot generated by a third embodiment computer system.

FIG. 5A shows a user view of co-browsing session 500a of an embodiment of the present disclosure. This co-browsing session displays time-to-expiry of the main payment transaction session (this is the same as the remaining time of the co-browsing session), as well as transaction participants and their status details, including payment status. The view here is on a terminal, but other users in this or other embodiments could be using other types of interfaces, such as a webpage, where the view may vary according to the mode each user employs. There are two options for logging in to the session: (i) the vendor/payee or the primary payer provides details of each payer and corresponding payment mode, allowing each user so authorized to log in; or (ii) all the co-payers log in to the session (in this embodiment, a session established via an Internet communications protocol that is defined for payment) in parallel as authorized by each of the other co-payers already logged in to the session. In either case, a transaction tree is created and a long-duration session is set up to track the state of all child transactions and to commit the parent transaction accordingly.

Co-browsing session 500a has three participants: Alice, Bob and Charlie. Alice is the initial participant, who adds Bob and Charlie to the parent payment transaction and starts the session (alternatively, Bob and Charlie can be added when they independently log in to the session). Alice, being the initial participant, is automatically logged in. She locks in her payment amount at $600. Bob and Charlie subsequently log in by their mode. Bob then locks in his payment amount at $600 (after locking a payment, a user has the option to unlock it and change the amount). At this point the session is waiting for Charlie to lock in his amount before the session times out. Alice and Bob can vote out Charlie if he does not respond for some time, or one or more of the participants can increase the session timeout period to give Charlie more time to respond. If Charlie does not respond before the session timeout, the actions of Alice and Bob are rolled back by default. Charlie does respond, however, locking in his payment amount. This action causes the group to collectively reach a tentative commitment to the target amount, triggering a final prompt to the user group to accept the overall transaction. Alice does so, and the split payment is completed. In other embodiments, the session might permit only the principal participant to commit the transaction, or the session itself might automatically complete the transaction once the sum of the individual commitments reaches the required amount. Other variations are also possible.

FIG. 5B shows a user view of co-browsing session 500b of an embodiment of the present disclosure. In this session, one of the users (Bob) does not have a locking option on his card (his bank did not provide one). For the users in the session who have a locking option (Alice and Charlie), a two-step payment mechanism is used: (i) the individual transaction amount within the session period is locked, and (ii) the individual payment is committed. For example, Alice is paying from a credit card where she has the option of locking in the transaction amount, so her individual transaction is not undertaken until the parent transaction is committed. This avoids the overhead of rolling back a payment. Bob, however, who is paying through a mobile device, does not have the option of locking in an amount, so he makes his payment outright. Providing both payment options is not only user friendly but also vendor friendly, because if, for whatever reason, the overall transaction is not completed, the vendor can easily and automatically detect an orphan payment such as Bob's and provide a refund. Notice that in this example session, the parent transaction was automatically committed once the transaction amount was reached.

Some embodiments of the present disclosure include a transaction manager. The transaction manager coordinates the overall transaction, including logging in participants, creating a child transaction for each member of the overall transaction, committing each child transaction and hence the parent transaction, and, if need be, rolling back one or more transactions. The transaction manager communicates with different payment gateways, where payments from different modes can be made synchronously under a parent payment transaction initiated by the primary payer. Along with managing the life cycle of the child payment transactions (including fund locking, payment, payment status, and rollback of payment for participating individuals), the transaction manager also maintains the long-life-cycle parent payment transaction, taking appropriate actions according to the status of its child transactions.

Figure 6:
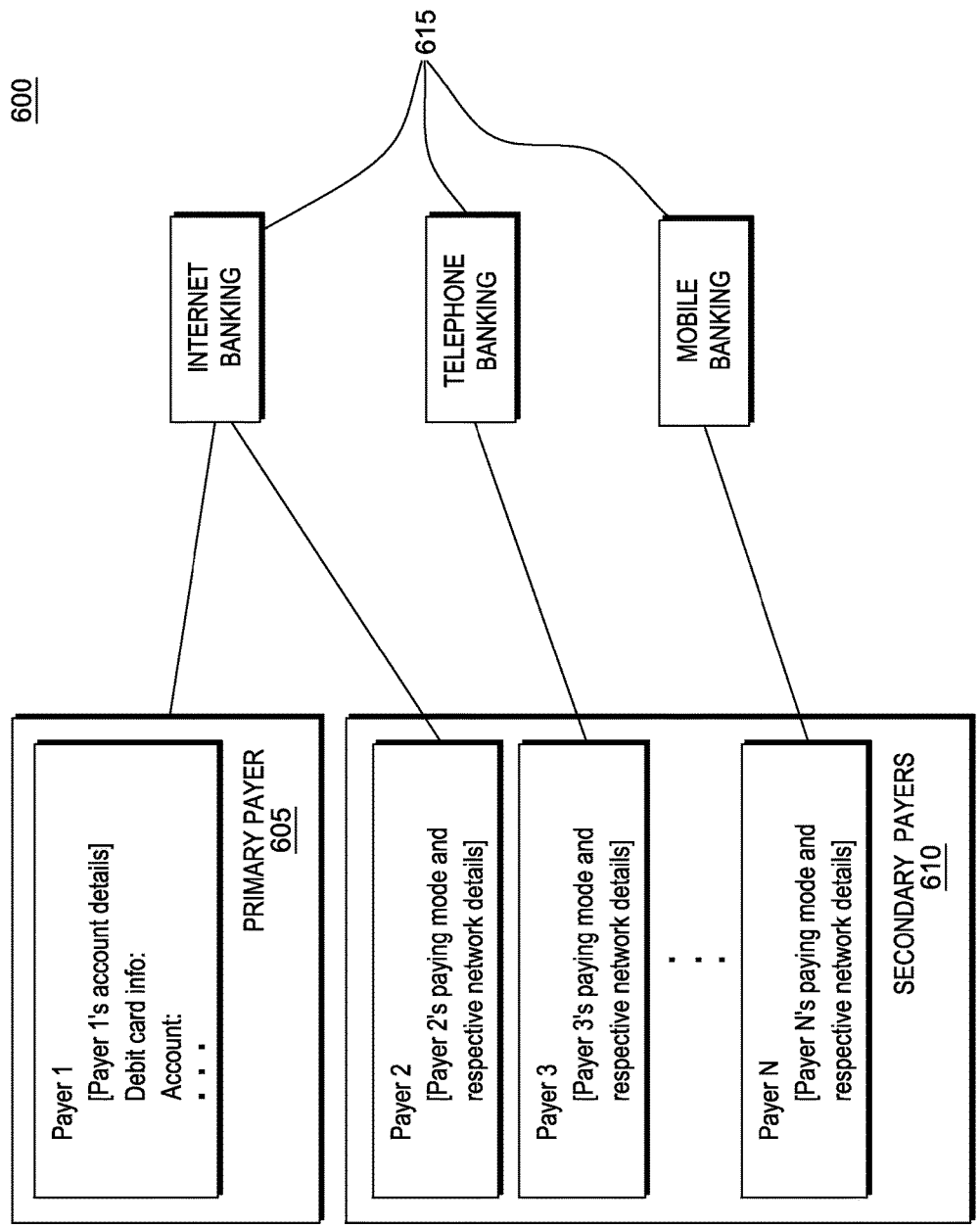
FIG. 6 is a schematic view of a transaction manager paradigm for a fourth embodiment computer system.

FIG. 6 shows transaction manager paradigm 600 according to an embodiment of the present disclosure. Transaction manager paradigm 600 includes: primary payer 605; secondary payers 610; and payment modes 615. Primary payer 605 initiates a group payment. Payer 605 is later joined by secondary payers 610. Each payer is using one of modes 615, which in this embodiment include Internet, phone banking, and mobile money. The transaction manager (not shown) creates a long-life parent payment transaction and also spawns child transactions for each participant payment. The transaction manager is equipped to connect to different payment gateways, all of which are managed under a single parent transaction. The transaction manager periodically checks the status of all child transactions, and if one or more of the child transactions fails or is interrupted, the transaction manager will cancel or roll back the parent payment. Alternatively, if all the child transactions are committed, the transaction manager will commit the parent payment. Other variations are also possible. For example, in other embodiments, commitments can be made automatically based on various triggers, such as committing the parent payment transaction once the required amount is met by some subset of the child transactions, or committing all locked child transactions on session expiry. In some embodiments, participants can even add or remove other participants based on various conditions (such as voting), thus keeping the parent payment transaction flexible. All these alternatives are made possible by the transaction manager.

Figure 7:
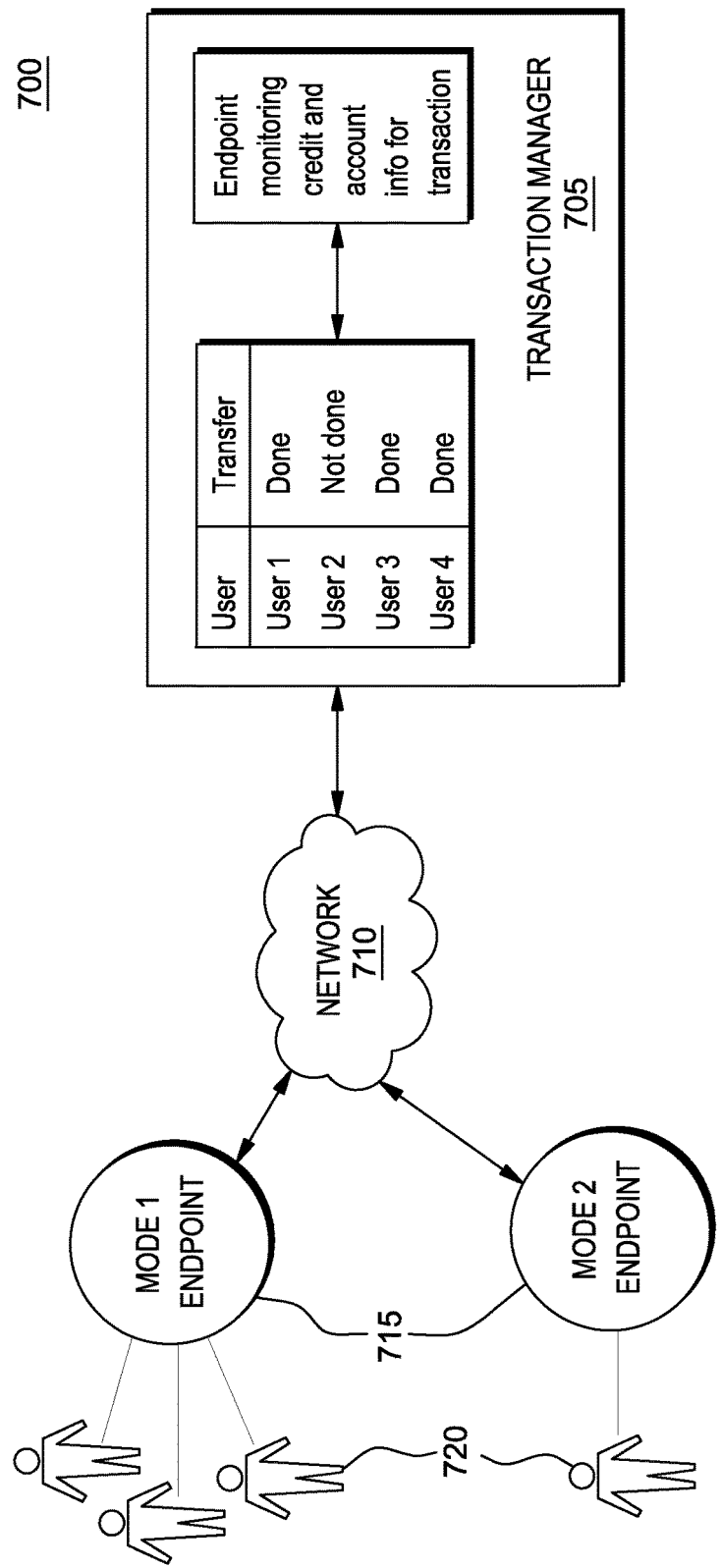
FIG. 7 is a schematic view of a fifth embodiment computer system.

FIG. 7 shows how an embodiment of the transaction manager maintains the life cycle of the payment transactions made by individual participants who use different payment channels, and hence how it maintains the overall payment transaction. Shown in FIG. 7 are: transaction manager system 700; transaction manager 705; network 710; mode endpoints (payment gateways) 715; and users 720. Participating users 720 provide required payment details and have committed payments that will process upon the parent payment being committed. Transaction manger 705 sets up connections with different payment gateways 715 as necessary depending on the mode of payment of each of users 720, and keeps track of the status of each payment. The parent payment is successfully completed when all the child payments are successful. If some of the child transactions fail, however, then by default all payments are rolled back. Alternatively, the primary payer can handle committing the parent payment manually by committing all successful payments and ignoring failed ones, or reducing the quantity of the item to be purchased based on the final amount paid (for example, when there are unsuccessful child payments). All these abilities make the transaction manager paradigm effective and well suited for handling a split payment scenario in the real world.

Figure 8:
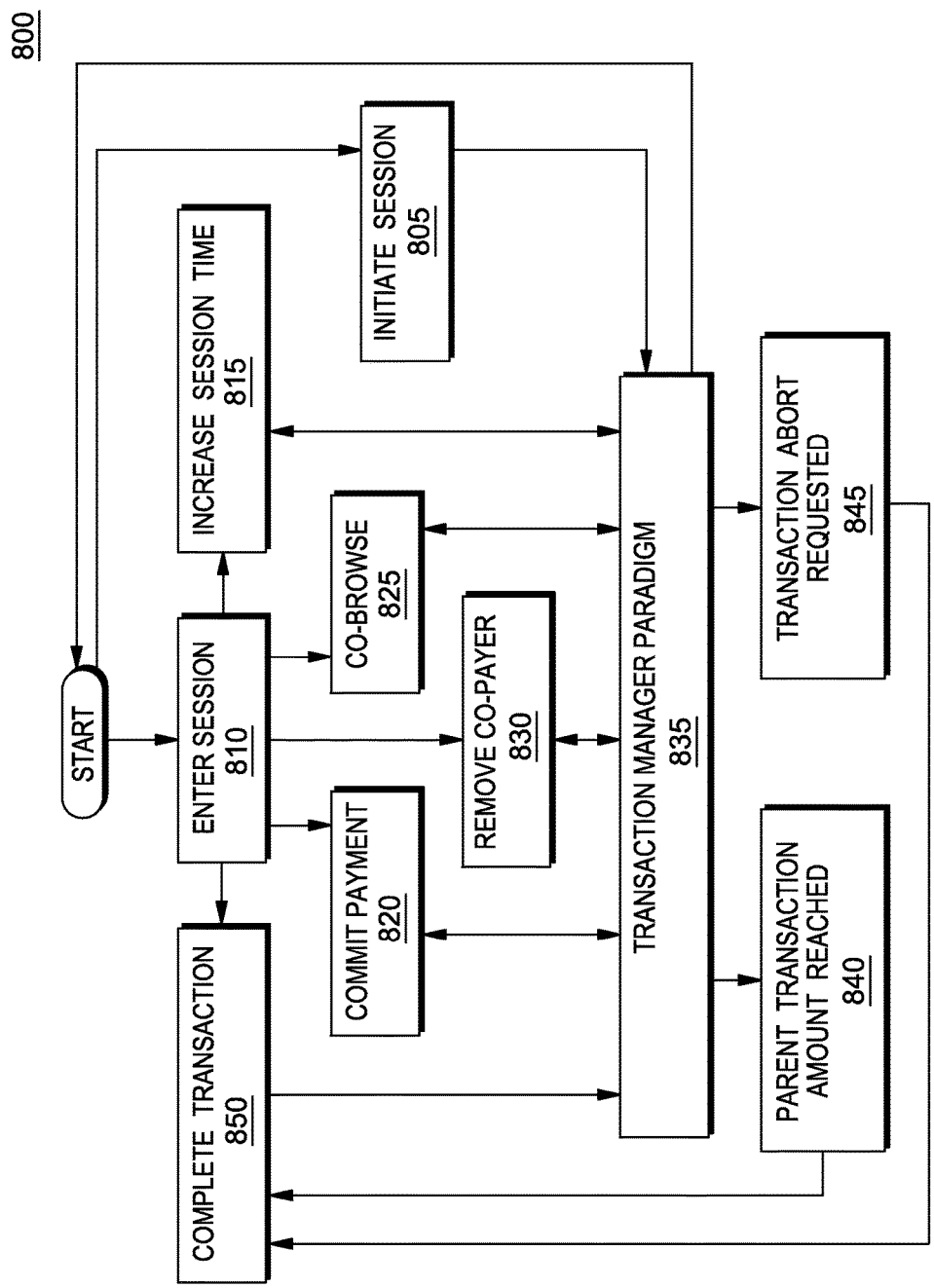
FIG. 8 is an action diagram for a sixth embodiment computer system.

FIG. 8 shows action diagram 800 for an embodiment of the present disclosure. Actions shown include: initiate session 805; enter session 810; increase session time 815; commit payment 820; co-browse 825; remove co-payer 830; transaction manager paradigm 835; parent transaction amount reached 840; transaction abort request 845; and complete transaction 850. The first action is always initiate session 805, where a primary payer initiates a transaction and the session manager returns the session id of the initialized session. A parent transaction session is thus created here, and the transaction session has some default expiry time associated with it. Alternatively, if one or more sessions already exist that are associated with that payer, the transaction manager gets the associated sessions list and returns that information. In enter session 810, the payer enters the particular session created or selected in initiate session 805. Co-payers are then added under co-browse action 825, and dependent child transactions are spawned as the co-paying participants log in under the umbrella of the parent payment transaction. These child transaction sessions are constrained to the session expiry of the parent. All the transactions (parent and children) are maintained by transaction manager paradigm 835, where the following actions can occur: (i) a participant can lock an associated individual payment amount or commit an individual payment amount in commit payment action 820; (ii) other participants can add or vote out a participant to the parent transaction in remove co-payer action 830; (iii) a primary payer can increase the expiry time for the parent session upon request in increase session time action 815; (iv) the parent transaction can be committed to successfully complete a payment once the transaction amount of the parent payment has been reached via the combination of parent transaction amount reached action 840 and complete transaction action 850; (v) if any transaction fails or is aborted, corrective actions can be taken as per a configuration established for the session, such as rolling back child transactions, or committing successful payments while ignoring failed ones via the combination of transaction abort requested action 845 and complete transaction action 850; and (vi) once the payment transaction is complete, notifications can be sent to payers through their respective payment mode in complete transaction action 850. Together, these actions provide an effective and robust way of making synchronous payments using different payment modes in a real-life scenario.

Some embodiments of the present disclosure maintain a transaction session synchronously and also across different clients and modes. To conduct a split transaction in real time among a number of co-payers, all co-payers have to be in sync. Each co-payer can view the details and status of other co-payers (such as via a co-browsing or co-editing system where only passwords are hidden from each other but other details involved in the transaction are visible), and the commit of the transaction is determined unanimously by all co-payers together in real time (or, alternatively, at the primary payer's discretion). To realize this functionality, a transaction manager at the vendor's end maintains long sessions and continuously synchronizes the information presented to all co-payers. Some embodiments of the present disclosure recognize that doing such a transaction asynchronously may have multiple issues regarding security and practicality, for instance if the transactions are committed asynchronously and separately then the vendor may be responsible for handling partial payments, which may be an undesirable situation.

Figure 9:
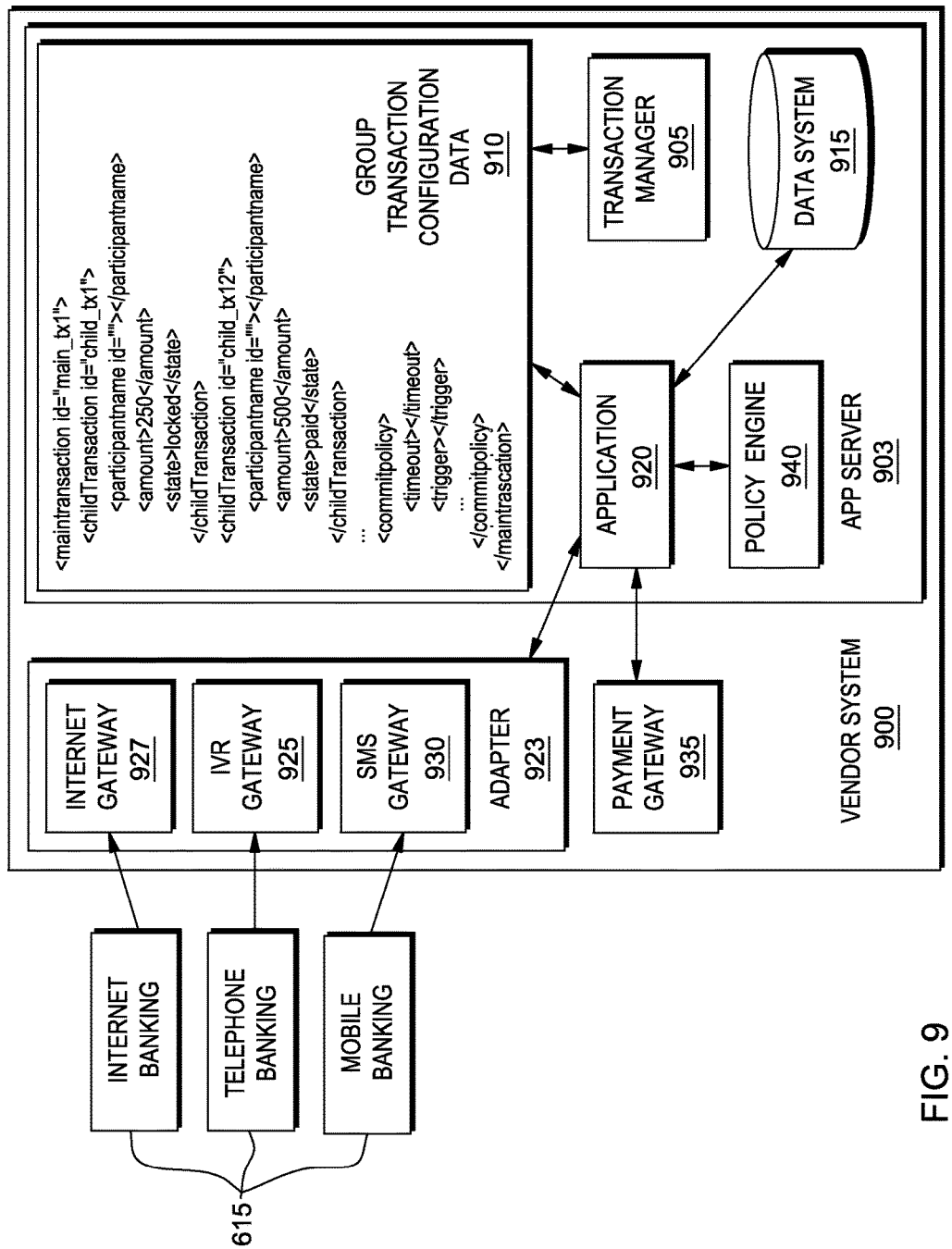
FIG. 9 is a schematic view of a seventh embodiment computer system.

As shown in FIG. 9, one embodiment of the present disclosure includes the following components: vendor system 900; application server 903; transaction manager 905; group transaction configuration data 910; enterprise information system (data system) 915; application 920; mode adapter 923; interactive voice response (IVR) gateway 925; Internet banking gateway 927; short message service (SMS) gateway 930; payment gateway 935; policy engine 940; and payment modes 615. In this embodiment, each payment mode 615 interfaces with vendor-side application 920 through one of gateways 925, 927, or 930 associated with adapter 923, as appropriate for the payment mode being used. Application 920 interfaces with data system 915 in support of a split payment transaction executed through the various payment modes 615 and coordinated by transaction manager 905, which maintains the status of a parent transaction and its children via group transaction configuration data 910. Payments are processed on the back end via payment gateway 935. Some embodiments of the present disclosure may have one, or more, of the following: (i) payment participation methods and connection exchanges, along with data modifications, covered as part of a single set of protocol(s); (ii) a mechanism/protocol enabling payment synchronously by more than one participant that involves separately locking, and then later committing; (iii) the participants are always in sync, and each of them can inspect the others' respective statuses; (iv) participant(s) can add a new contributing participant for the payment; (v) participants can lock the payment amount and commit unanimously, and all together; (vi) the server maintains long sessions and continuously synchronizes all the co-payers; (vii) the server provides the infrastructure to maintain prolonged live sessions; and/or (viii) a single transaction-managing component at the vendor's end.

Some embodiments of the present disclosure may have one, or more, of the following features, characteristics, and/or abilities: (i) a transaction is unblocked for every individual payment synchronously and the transaction completes when all payments have been made; (ii) no session or sessions have larger time intervals for expiring than others; (iii) authority for transaction completion is controlled by one or more primary payers; (iv) users commit transactions together in synchronous mode; (v) the transaction system module sits in the e-commerce vendor tier; and/or (vi) a transaction session is maintained in combined form, independent of the mode or mechanism used by each participant.

Some embodiments of the present disclosure concentrate on the technical aspects of split payments, and the process participation mechanism in some embodiments allows for synchronous payments, asynchronous payments or mixed synchronous/asynchronous payments (as shown above in FIG. 4 and its related discussion).

Some embodiments of the present disclosure may include one, or more, of the following features, characteristics and/or advantages, in that they: (i) concentrate on the system and mechanism for transaction management which actually works for split payments in real world scenarios (especially cases where the cost of a commodity changes dynamically); (ii) establish and maintain a session; (iii) mainly include synchronous transaction processes; (iv) mainly implement the process of synchronous split payment; (v) include a mechanism for asynchronous payment and/or mixed type payment; (vi) provide for synchronous payment (that is, committing the payments of all the participants substantially together at once); (vii) provide for asynchronous payment (that is, participants can commit their payments over a long period, where the cost of the commodity does not change dynamically); and/or (viii) provide for mixed type transactions, where a particular percentage of the total amount is committed synchronously and the remaining amount can be committed asynchronously.

Some embodiments of the present invention may include one, or more, of the following features characteristics and/or advantages: (i) a method to split a payment transaction between multiple related parties and synchronously execute it with a financial entity; (ii) locking the transaction amount within the session period; (iii) committing the payment and the commit of each individual payment trigger managing a parent session committing the payment synchronously; (iv) providing the user a mechanism to accept the locking and increase the session time for synchronization of the co-payers; (v) a mechanism of doing a split transaction in real-time along with a mechanism which defines a server architecture providing the infrastructure to maintain prolonged live sessions and keep other participants in the transaction synchronous; (vi) a mechanism of doing a split transaction in real-time along with a mechanism which defines a server architecture providing the infrastructure so that final commitment can be issued by one of the payers; (vii) a mechanism of doing a split transaction in real time along with a mechanism which defines a server architecture providing the infrastructure so that final commitment can be automated based on a vendor's preference; (viii) a mechanism of doing a split transaction in real time along with a mechanism which defines a server architecture providing the infrastructure so that final commitment can be an automatic payment or any specific policy; (ix) a co-browsing or co-editing system where, during the transaction, multiple activities can be carried out, like a mechanism to dynamically change the amounts in an ongoing transaction; (x) maintaining a single "long-lived" transaction within which multiple payment transactions are accomplished; (xi) policy-driven split payment where policies can be defined by vendors and primary participants; (xii) there is no component in between vendor and payor(s); (xiii) there is no intermediate entity which handles the committed payments from participants; and/or (xiv) the machine logic can lie in a secure and practical payment vendor module.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Software storage device: any device (or set of devices) capable of storing computer code in a manner less transient than a signal in transit.

Tangible medium software storage device: any software storage device (see definition, above) that stores the computer code in and/or on a tangible medium.

Non-transitory software storage device: any software storage device (see definition, above) that stores the computer code in a non-transitory manner.

Computer: any device with significant data processing and/or machine readable instruction reading capabilities including, but not limited to: desktop computers, mainframe computers, laptop computers, field-programmable gate array (fpga) based devices, smart phones, personal digital assistants (PDAs), body-mounted or inserted computers, embedded-device-style computers, and application-specific integrated circuit (ASIC) based devices.

Financial institutions: include, but are not limited to, banks, credit unions, credit card issuers, e-commerce financial businesses, retailers with significant consumer financial operations, utilities (for example telecommunications providers) with significant consumer financial operations, brokerage houses, insurance companies, financial transaction facilitators such as payment clearing houses, governmental entities, and money lending companies.

Between: between and/or among.

What is claimed is:

1. A method comprising:
    establishing a set of communication session(s), over a communication network, between a plurality of payers and a transaction management computer;
    receiving from each payer of the plurality of payers, through the communication session(s), a commitment to collectively enter into a first financial transaction;
    wherein:
    the set of communication session(s) is established under control of a transaction manager module of the transaction management computer;
    each payer of the plurality of payers is connected, by the set of communication session(s), to the transaction management computer at a time of receipt of a latest-in-time commitment;
    the financial transaction is a split payment transaction, wherein at least a first payer of the plurality of payers commits to pay at least a first portion of a total payment and a second payer of the plurality of payers commits to pay at least a second portion of the total payment; and
    the set of communication session(s) is maintained in at least one of the following ways: (i) as a co-browsing session between, at least, the payers of the plurality of payers and the transaction management computer, and/or (ii) with continuous event logging, such that each payer of the plurality of payers connected to the transaction management computer is kept in sync with respect to commitment status of each other payer of the plurality of payers,
    wherein the communication sessions are concurrent communication sessions over which the each payer executes the split payment transaction,
    wherein a commitment user interface is transmitted to the each payer over the concurrent communication sessions, the concurrent communication sessions keeping the commitment user interface in sync with all of the plurality of payers, the commitment user interface displayed with different clickable buttons enabled for the each payer,
    wherein the transaction management computer is caused to establish the set of communication session(s) via connecting to different gateway(s) and maintain a communication session concurrently over a communication channel for said each payer as a multi-way split session in the split payment transaction;
    establishing a communication session, over the communication network, between the transaction management computer and a set of payment execution payment computer(s); and
    responsive to receipt of commitment from all payers, requesting, by the transaction management computer and from the set of payment execution computer(s), execution of all payments to be made under terms of the first financial transaction.

2. The method of claim 1 wherein:
    the set of communication session(s) is maintained as a co-browsing session between, at least, the payers of the plurality of payers and the transaction management computer.

3. The method of claim 1 further comprising:
    supporting a life cycle of each individual payment; and
    executing all payments associated with the first financial transaction.

4. The method of claim 1 wherein:
    each payer of the plurality of payers is continuously connected, by the set of communication session(s), to the transaction management computer from at least a time of receipt of an earliest-in-time commitment through at least the time of receipt of the latest-in-time commitment.

5. The method of claim 1 wherein the set of communication session(s) is one of the following types: (i) constituted by a single communication in which all payers and the transaction management computer participate, or (ii) includes a dedicated and separate communication session respectively between each of the payers and the transaction management computer.

6. The method of claim 1, wherein the set of payment execution payment computer(s) comprises a first payment execution payment computer, the method further comprising:

establishing the communication session, over the communication network, between the transaction management computer and the first payment execution payment computer; and responsive to receipt of commitment from all payers, requesting, by the transaction management computer and from the first payment execution computer, execution of a first payment made under terms of the first financial transaction.

7. The method of claim 6 wherein:

each of the plurality of payers is continuously connected, by the set of communication session(s), to the transaction management computer from at least a time of receipt of the latest-in-time commitment through at least a time of requesting execution of the first payment.

8. The method of claim 6 further comprising:

requesting notification, by the transaction management computer and from the set of payment execution computer(s), of successful execution of all payments to be made under terms of the first financial transaction;

wherein each payer of the plurality of payers is continuously connected, by the set of communication session(s), to the transaction management computer from at least a time of receipt of the latest-in-time commitment through at least a time of receipt of a latest-in-time notification of successful execution.

9. A computer program product comprising:

a computer readable storage medium having encoded thereon:

first program instructions executable by a computer to cause the computer to establish a set of communication session(s), over a communication network, between a plurality of payers and a transaction management computer; and second program instructions executable by the computer to cause the computer to receive from each payer of the plurality of payers, through the communication sessions(s), a commitment to collectively enter into a first financial transaction;

wherein:

the set of communication sessions(s) is established under control of a transaction manager module of the transaction management computer;

each payer of the plurality of payers is connected, by the set of communication sessions(s), to the transaction management computer at a time of receipt of a latest-in-time commitment;

the financial transaction is a split payment transaction, wherein at least a first payer of the plurality of payers commits to pay at least a first portion of a total payment and a second payer of the plurality of payers commits to pay at least a second portion of the total payment; and the set of communication session(s) is maintained in at least one of the following ways: (i) as a co-browsing session between, at least, the payers of the plurality of payers and the transaction management computer, and/or (ii) with continuous event logging, such that each payer of the plurality of payers connected to the transaction management computer is kept in sync with respect to commitment status of each other payer of the plurality of payers;

the computer comprises the transaction management computer wherein the transaction management computer is caused to establish the set of communication session(s) via connecting to different gateway(s) and maintain a communication session over a communication channel for said each payer as a multi-way split session in the split payment transaction, wherein the communication sessions are concurrent communication sessions over which the each payer executes the split payment transaction, wherein a commitment user interface is automatically transmitted to the each payer over the concurrent communication sessions, the concurrent communication sessions automatically keeping the commitment user interface in sync with all of the plurality of payers, the commitment user interface displayed with different clickable buttons enabled for the each payer;

third program instructions executable by the computer to cause the computer to establish the communication session, over the communication network, between the transaction management computer and a first payment execution payment computer; and fourth program instructions executable by the computer to cause the computer to, responsive to receipt of commitment from all payers, request, by the transaction management computer and from the first payment execution computer, execution of a first payment made under terms of the first financial transaction.

10. The computer program product of claim 9, wherein:

the set of communication session(s) is maintained as a co-browsing session between, at least, the payers of the plurality of payers and the transaction management computer.

11. The computer program product of claim 9, wherein third program instructions executable by the computer causes the computer to support a life cycle of each individual payment and the fourth program instructions executable by the computer causes the computer to execute all payments associated with the first financial transaction.

12. The computer program product of claim 9, wherein:

each payer of the plurality of payers is continuously connected, by the set of communication session(s), to the transaction management computer from at least a time of receipt of an earliest-in-time commitment through at least the time of receipt of the latest-in-time commitment.

13. The computer program product of claim 9, wherein the set of communication session(s) is one of the following types: (i) constituted b a single communication in which all payers and the transaction management computer participates, or (ii) includes a dedicated and separate communication session respectively between each of the payers and the transaction management computer.

14. The computer program product of claim 9, wherein:

each payer of the plurality of payers is continuously connected, by the set of communication session(s), to the transaction management computer from at least a time of receipt of the latest-in-time commitment through at least a time of requesting execution of the first payment.

15. The computer program product of claim 9, wherein the computer readable storage medium further comprises:

fifth program instructions executable by the computer to cause the computer to establish a communication session, over the communication network, between the transaction management computer and a set payment execution payment computer(s); and sixth program instructions executable by the computer to cause the computer to, responsive to receipt of commitment from all payers, request, by the transaction management computer and from the set of payment execution computer(s), execution of all payments to be made under terms of the first financial transaction; and seventh program instructions executable by the computer to cause the computer to request notification, by the transaction management computer and from the set of payment execution computer(s), of successful execution of all payments to be made under terms of the first financial transaction;

wherein each payer of the plurality of payers is continuously connected, by the set of communication session(s), to the transaction management computer from at least a time of receipt of the latest-in-time commitment through at least a time of receipt of a latest-in-time notification of successful execution.

16. A computer system comprising:

a processor(s) set; and a storage device;

wherein:

the processor set is operatively coupled to the storage device, the processor operable to establish a set of communication session(s), over a communication network, between a plurality of payers and a transaction management computer; and the processor further operable to receive from each payer of the plurality of payers, through the communication session(s), a commitment to collectively enter into a first financial transaction;

wherein:

the set of communication session(s) is established under control of a transaction manager module of the transaction management computer;

each payer of the plurality of payers is connected, by the set of communication session(s), to the transaction management computer at a time of receipt of a latest-in-time commitment;

the financial transaction is a split payment transaction, wherein at least a first payer of the plurality of payers commits to pay at least a first portion of a total payment and a second payer of the plurality of payers commits to pay at least a second portion of the total payment; and the set of communication session(s) is maintained in at least one of the following ways: (i) as a co-browsing session between, at least, the payers of the plurality of payers and the transaction management computer, and/or (ii) with continuous event logging, such that each payer of the plurality of payers connected to the transaction management computer is kept in sync with respect to commitment status of each other payer of the plurality of payers;

the transaction management computer comprises the processor wherein the transaction management computer establishes the set of communication session(s) via connecting to different gateway(s) and maintains a communication session over a communication channel for said each payer as a multi-way split session in the split payment transaction, wherein the communication sessions are concurrent communication sessions over which the each payer executes the split payment transaction, wherein a commitment user interface is automatically transmitted to the each payer over he concurrent communication sessions, the concurrent communication sessions automatically keeping the commitment user interface in sync with all of the plurality of payers, the commitment user interface displayed with different clickable buttons enabled for the each payer, the processor operable to establish the communication session, over the communication network, between the transaction management computer and a first payment execution payment computer, and the processor operable to, responsive to receipt of commitment from all payers, request, by the transaction management computer and from the first payment execution computer, execution of a first payment made under terms of the first financial transaction.

17. The system of claim 16, wherein:

the set of communication session(s) is maintained as a co-browsing session between, at least, the payers of the plurality of payers and the transaction management computer.

18. The system of claim 16, wherein the processor is further operable to support a life cycle of each individual payment, processor further operable to execute all payments associated with the first financial transaction.

19. The system of claim 16, wherein:

each payer of the plurality of payers is continuously connected, by the set of communication session(s), to the transaction management computer from at least a time of receipt of an earliest-in-time commitment through at least the time of receipt of the latest-in-time commitment.

* * * * *